US008295176B2

(12) United States Patent
Khasnabish

(10) Patent No.: US 8,295,176 B2
(45) Date of Patent: Oct. 23, 2012

(54) PRIORITY CALL ROUTING

(75) Inventor: Bhumip Khasnabish, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 444 days.

(21) Appl. No.: 11/554,800

(22) Filed: Oct. 31, 2006

(65) Prior Publication Data
US 2008/0101224 A1 May 1, 2008

(51) Int. Cl.
G06F 11/00 (2006.01)
(52) U.S. Cl. ......... 370/235; 370/238; 370/232; 370/237
(58) Field of Classification Search .................. 370/238, 370/232, 237; 709/225
See application file for complete search history.

(56) References Cited

U.S. PATENT DOCUMENTS

| 6,411,601 B1* | 6/2002 | Shaffer et al. | 370/230 |
|---|---|---|---|
| 6,934,258 B1* | 8/2005 | Smith et al. | 370/238 |
| 7,050,447 B2* | 5/2006 | Silverman et al. | 370/412 |
| 2002/0166063 A1* | 11/2002 | Lachman et al. | 713/200 |
| 2003/0131132 A1* | 7/2003 | Cheng et al. | 709/239 |
| 2003/0154280 A1* | 8/2003 | Teig et al. | 709/225 |
| 2004/0172658 A1* | 9/2004 | Rakib et al. | 725/120 |
| 2006/0003763 A1* | 1/2006 | Almgren | 455/432.1 |
| 2006/0168337 A1* | 7/2006 | Stahl et al. | 709/240 |
| 2006/0274729 A1* | 12/2006 | Self | 370/352 |
| 2007/0058658 A1* | 3/2007 | Ruckart | 370/444 |
| 2007/0060097 A1* | 3/2007 | Edge et al. | 455/404.1 |
| 2007/0121500 A1* | 5/2007 | McBride et al. | 370/230 |
| 2007/0206620 A1* | 9/2007 | Cortes et al. | 370/412 |
| 2009/0190579 A1* | 7/2009 | Witzel et al. | 370/353 |

OTHER PUBLICATIONS

Newport Networks Ltd, Session Border Control in IMS-based Converged Networks, Nov. 2005, WWW.NEWPORT-NETWORKS.COM, All Pages.*
Aftab Ahmad, Wireless and Mobile Data Networks, 2005, Wiley-IEEE, pp. 166 and 187.*

* cited by examiner

Primary Examiner — Huy D Vu
Assistant Examiner — Omer Mian

(57) ABSTRACT

A method includes receiving a priority message in an Internet Protocol Multimedia Subsystem (IMS) and identifying, via the IMS, resource availability through a first network and a second network. The method further includes routing, via the IMS, the priority message through one of the first network or the second network based on the identified resource availabilities of the first network and the second network.

22 Claims, 8 Drawing Sheets

PRIORITY CALL ROUTING

BACKGROUND INFORMATION

The Internet Protocol Multimedia Subsystem (IMS) provides mobile and fixed multimedia services. The aim of IMS is not only to provide new services, but all the services, current and future, that the Internet provides. In this way, IMS gives network operators and service providers the ability to control and charge for each service. In addition, users are given the ability to execute services from their home networks, as well as when the users are roaming.

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Figure 1:
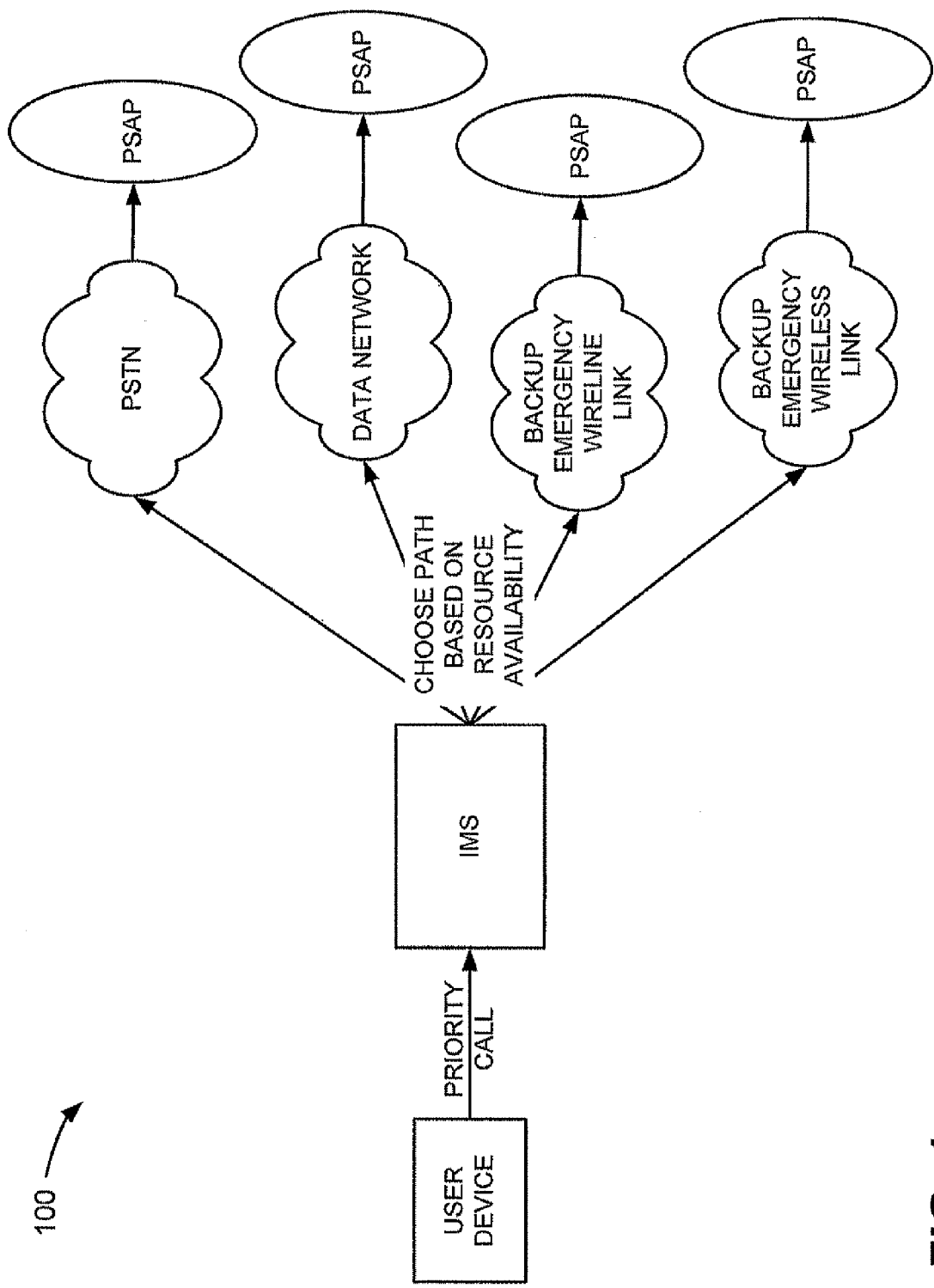
FIG. 1 illustrates an exemplary overview of implementations consistent with principles of the invention.

Implementations described herein relate to priority call routing in an Internet Protocol (IP) Multimedia Subsystem (IMS). FIG. 1 illustrates an exemplary overview 100 of implementations consistent with principles of the invention. As illustrated, a user device may place a priority call, such as a 9-1-1 call. The IMS may receive a message from the user device. IMS may identify that the message is a high priority message (e.g., based on information in the header of the message). Upon identifying the message as a high priority message, the IMS may determine resource availability through the data network and the Public Switched Telephone Network (PSTN) for establishing the call as quickly as possible to a Public Safety Answering Point (PSAP). If, for example, the resource utilization through the data network exceeds a threshold and the resource utilization through the PSTN does not exceed the threshold, the IMS may establish the call through the PSTN to the PSAP since the call is likely to be established more quickly through the PSTN. If, on the other hand, the resource utilization through the PSTN exceeds a threshold and the resource utilization through the data network does not exceed the threshold, the IMS may establish the call through the data network to the PSAP since the call is likely to be established more quickly through the data network. In some situations, the resource utilization through the data network may exceed the threshold and the resource utilization through the PSTN may exceed the threshold. In those situations, the IMS may establish the call through a backup emergency wireline link or a backup emergency wireless link.

Figure 2:
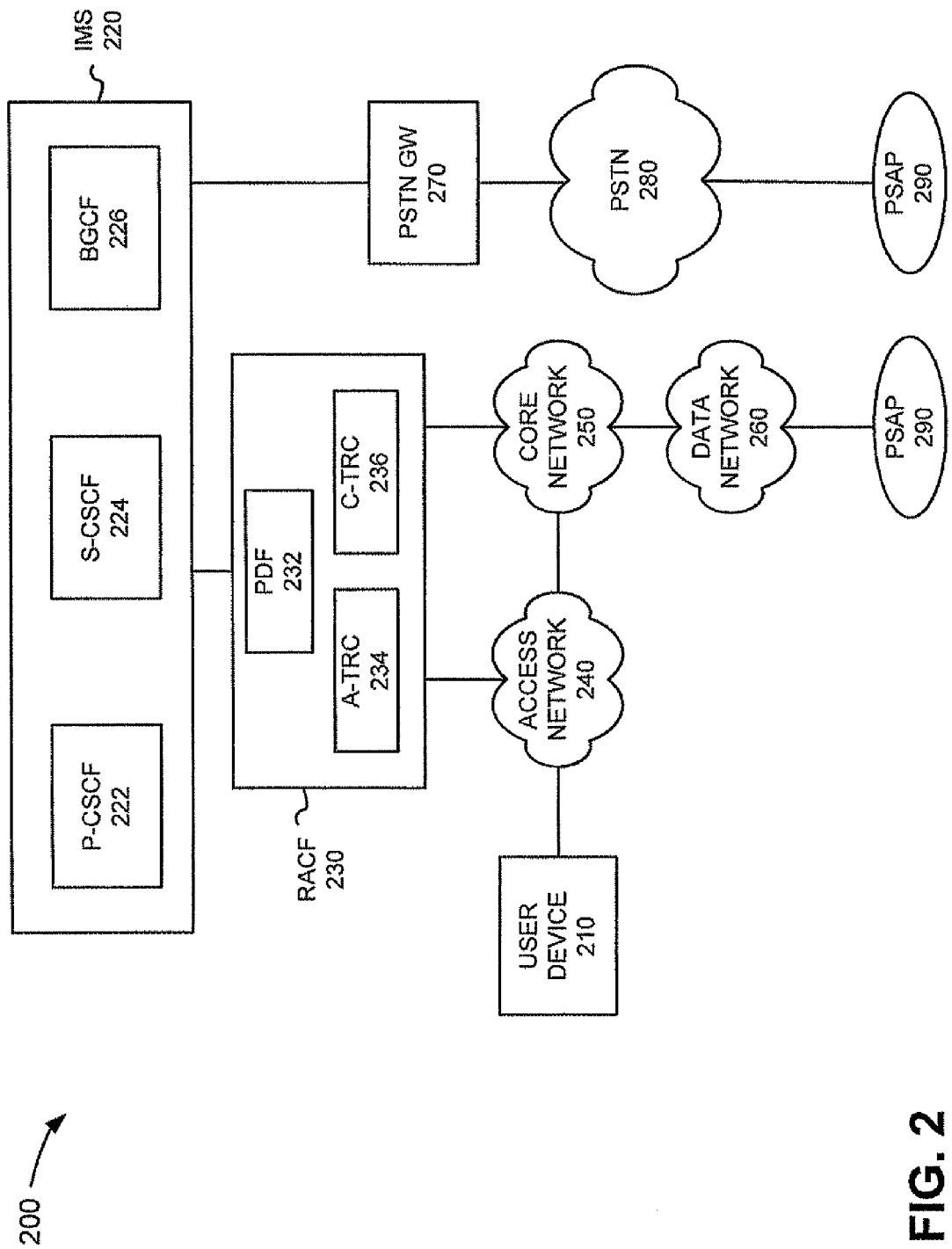
FIG. 2 illustrates an exemplary system in which systems and methods, consistent with principles of the invention, may be implemented.

FIG. 2 illustrates an exemplary system 200 in which systems and methods, consistent with principles of the invention, may be implemented. As illustrated, system 200 may include a user device 210, an IMS 220, a Resource Admission and Control Function (RACF) 230, an access network 240, a core network 250, a data network 260, a PSTN gateway (GW) 270, a PSTN 280, and PSAPs 290. The number of components illustrated in FIG. 2 is purely exemplary. A typical system 200 may include more or fewer user devices 210, IMSs 220, RACFs 230, access networks 240, core network 250, data networks 260, PSTN gateways 270, PSTNs 280, and PSAPs 290 than illustrated in FIG. 2. Moreover, system 200 may include other components than illustrated in FIG. 2 that aid in establishing calls.

User device 210 may include one or more devices capable of establishing a telephone call (also called a session) with another device, such as a PSAP 290. For example, user device 210 may include a Session Initiation Protocol (SIP) telephone, a type of computer system, such as a mainframe, minicomputer, or personal computer, and/or some other device capable of placing telephone calls.

IMS 220 may include a group of components for providing telecommunications services. As illustrated, IMS 220 may include a Proxy Call Session Control Function (P-CSCF) 222, a Serving Call Session Control Function (S-CSCF) 224, and a Breakout Gateway Control Function (BGCF) 226. IMS 220 may include other components than illustrated in FIG. 2.

P-CSCF 222 may receive session requests from user devices 210 located at both public IP networks and private IP networks. P-CSCF 222 may validate requests, forward the requests to selected destinations, and process and forward the responses.

S-CSCF 224 may be viewed as the brain of IMS 220. S-CSCF 224 may perform session control, registration, and service invocation for users of IMS 220. S-CSCF 224 may receive a user profile from a home subscriber server and route sessions requested by an IMS user (also called an "IMS subscriber" or "subscriber") associated with a user device 210. In one implementation, S-CSCF 224 may provide priority call handling based on resource availability information.

BGCF 226 may connect IMS-initiated calls to Circuit Switch (CS) customers (e.g., an IMS user calling a telephone number in the PSTN). BGCF 226 may, based on a routing policy, select an appropriate network in which the connection is to be made or may select the appropriate gateway to the other network. In one implementation, BGCF 226 may obtain resource availability information for, for example, PSTN 280 and provide the resource availability information to S-CSCF 224.

RACF 230 may include components that manage transport resources within access and/or core networks, such as networks 240 and 250, and at network boundaries, such as at edge nodes, session border gateways, etc. As illustrated, RACF 230 may include a Policy Decision Function (PDF) 232, an Access Transport Resource Control (A-TRC) function 234, and a Core Transport Resource Control (C-TRC) function 236. RACF 230 may include other components than illustrated in FIG. 2.

PDF 232 may provide service-based local policy control. PDF 232 may authorize resources based on policy and resource availability. In one implementation, PDF 232 may obtain resource availability information for, for example, networks 240, 250, and/or 260 and provide the resource availability information to S-CSCF 224, A-TRC 234 may collect and maintain transport resource status information for devices within access network 240. Moreover, A-TRC 234 may collect and maintain topology information for access network 240. A-TRC 234 may also configure transport resources in access network 240.

C-TRC 236 may collect and maintain transport resource status information for devices within core network 250. Moreover, C-TRC 236 may collect and maintain topology information for core network 250. C-TRC 236 may also configure transport resources in core network 250.

Access network 240 may include one or more networks through which user device 210 accesses a service provider's core network, such as core network 250. Core network 250 may include one or more networks associated with a service provider. Data network 260 may include one or more networks, such a local area network (LAN), a wide area network (WAN), an intranet, the Internet, or a combination of networks.

PSTN gateway 270 may convert traffic between a data network, such as access network 240 or core network 250, and PSTN 280. In one implementation consistent with principles of the invention, PSTN gateway 270 may convert SIP messages to PSTN signaling and convert PSTN signaling to SIP messages. PSN 280 may include one or more circuit-switched networks that transport signaling and/or content (e.g., voice data) traffic.

PSAPs 290 may include one or more devices for receiving and processing emergency calls (e.g., 9-1-1 calls). For example, PSAPs 290 may include a public entity having personnel (e.g., operators or call takers) and/or equipment for initially answering or fielding incoming 9-1-1 calls. PSAPs 290 can be located in the vicinity of the source of the emergency call and in the vicinity of emergency service providers to which the call can be forwarded. In one implementation, a first PSAP 290 may be provided for handling calls from data network 260 and a second PSAP 290 may be provided for handling calls from PSTN 280. In other implementations, a single PSAP 290 may be provided for handling calls from both data network 260 and PSTN 280.

Figure 3:
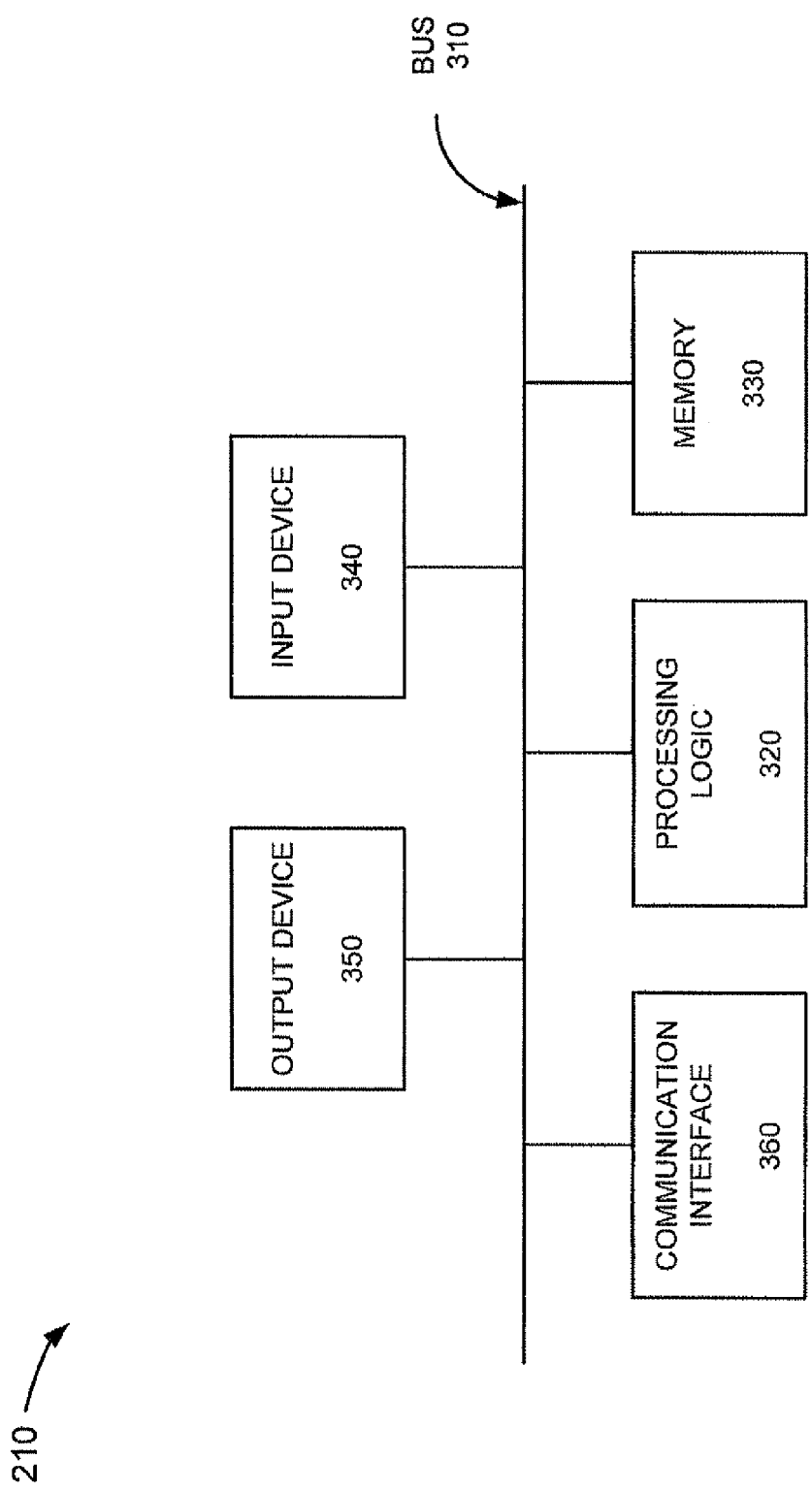
FIG. 3 illustrates an exemplary configuration of the user device of FIG. 2.
Figure 4:
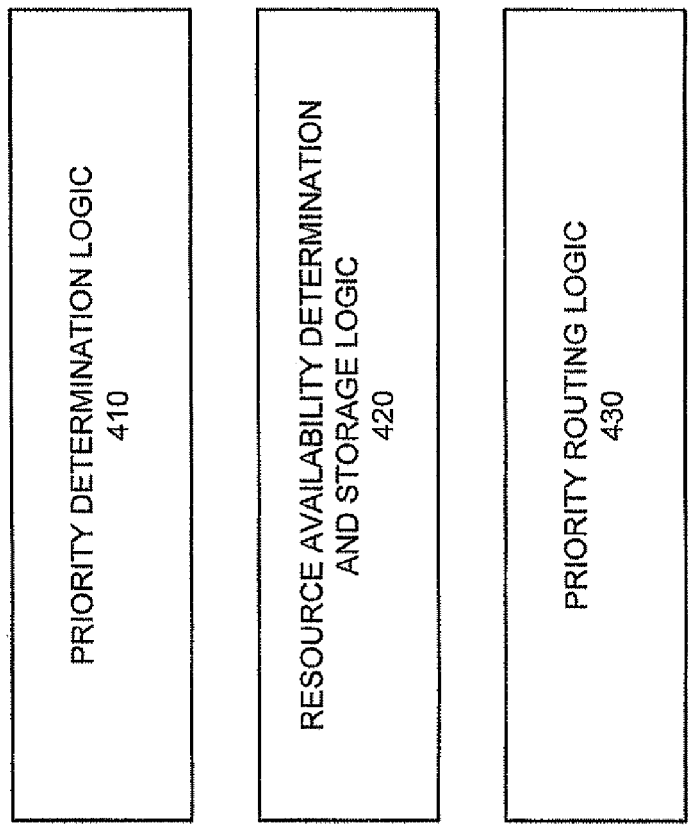
FIG. 4 illustrates an exemplary functional block diagram of a portion of the Serving Call Session Control Function (S-CSCF) of FIG. 2.

FIG. 3 illustrates an exemplary configuration of user device 210 in an implementation consistent with the principles of the invention. S-CSCF 224 may be similarly configured.

As illustrated, user device 210 may include a bus 310, processing logic 320, a memory 330, an input device 340, an output device 350, and a communication interface 360. It will be appreciated that user device 210 may include other components (not shown) that aid in receiving, transmitting, and/or processing data. Moreover, it will be appreciated that other configurations are possible.

Bus 310 may permit communication among the components of user device 210. Processing logic 320 may include any type of processor or microprocessor that interprets and executes instructions. In other implementations, processing logic 320 may be implemented as or include an application specific integrated circuit (ASIC), field programmable gate array (FPGA), or the like. Memory 330 may include a random access memory (RAM) or another type of dynamic storage device that stores information and instructions for execution by processing logic 320, a read only memory (ROM) or another type of static storage device that stores static information and instructions for processing logic 320, and/or some other type of magnetic or optical recording medium and its corresponding drive for storing information and/or instructions.

Input device 340 may include a device that permits a user to input information into user device 210, such as a keyboard, a keypad, a mouse, a pen, a microphone, one or more biometric mechanisms, and the like. Output device 350 may include a device that outputs information to the user, such as a display, a printer, a speaker, etc.

Communication interface 360 may include any transceiver-like mechanism that enables user device 210 to communicate with other devices and/or systems. For example, communication interface 360 may include mechanisms for communicating with PSAP 290 via one or more networks.

As will be described in detail below, user device 210 may allow a user to place a priority call, such as an emergency 9-1-1 call, a Government Emergency Telecommunications Service (GETS) call, etc. User device 210 may perform these and other acts in response to processing logic 320 executing software instructions contained in a computer-readable medium, such as memory 330. A computer-readable medium may be defined as one or more memory devices and/or carrier waves. The software instructions may be read into memory 330 from another computer-readable medium or from another device via communication interface 360. The software instructions contained in memory 330 may cause processing logic 320 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Priority determination logic 410 may receive a message (e.g., a SIP message) from user device 210 and determine whether the message is a high priority message, such as a 9-1-1 message, a GETS message, etc. In some implementations, priority determination logic 410 may determine whether the message is a high priority message based on information stored in the header of the message. For example, in one implementation, priority determination logic 410 may determine that a message (e.g., a SIP message) is a high priority message based on a Resource Priority header field of the message. Other header fields may alternatively be used for indicating that a message is a high priority message.

Resource availability determination and storage logic 420 may receive and store resource availability information from devices in system 200. For example, in one implementation, resource availability determination and storage logic 420 may receive resource availability information from BGCF 226 and PDF 232. The resource availability information from BGCF 226 may include information regarding the availability of resources through PSTN 280. The resource availability information from PDF 232 may include information regarding the availability of resources through access network 240, core network 250, and/or data network 260. Resource availability determination and storage logic 420 may store the resource availability information received from BGCF 226 and PDF 232.

Priority routing logic 430 may route priority messages to a PSAP 290 via a path determined based on the resource availability information stored by resource availability determination and storage logic 420. For example, priority routing logic 430 may determine whether to route a priority message through data network 260 or PSTN 280. In one implementation, priority routing logic 430 may select data network 260 or PSTN 280 by comparing the resources available through data network 260 to a threshold and comparing the resources available through PSTN 280 to the threshold. The threshold may be set by a system administrator. Moreover, a different threshold may be associated with data network 260 and PSTN 280 in some implementations.

Figure 5:
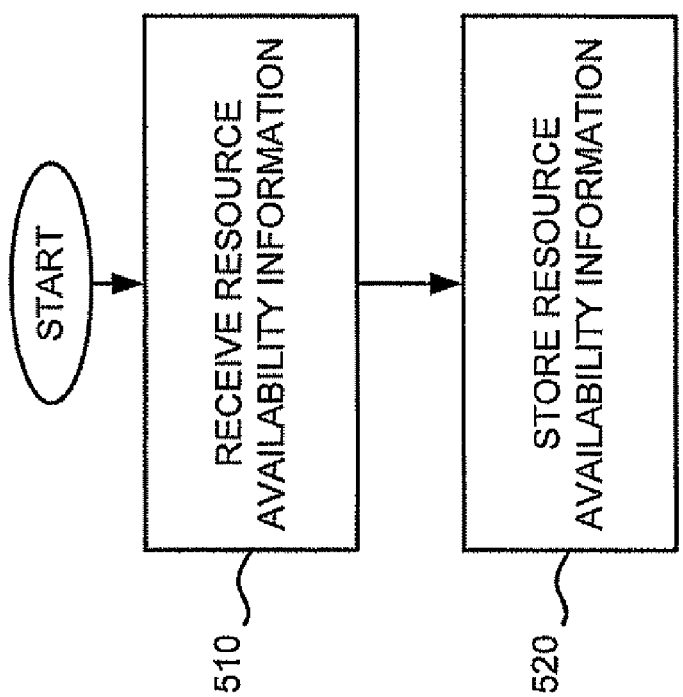
FIG. 5 illustrates a flow chart of exemplary processing for obtaining resource availability information in an exemplary implementation consistent with principles of the invention.

FIG. 5 illustrates a flow chart of exemplary processing for obtaining resource availability information in an exemplary implementation consistent with principles of the invention. In one implementation, the processing described in FIG. 5 may be implemented by S-CSCF 224. In another implementation, the processing may be implemented by another device in system 200.

Processing may begin with S-CSCF 224 receiving resource availability information from BGCF 226 and/or PDF 232 (block 510). As indicated above, the resource availability information from BGCF 226 may include information regarding the availability of resources through PSTN 280 and the resource availability information from PDF 232 may include information regarding the availability of resources through access network 240, core network 250, and/or data network 260. S-CSCF 224 may receive the resource availability information from BGCF 226 and/or PDF 232 via, for example, a Publish, Subscribe, Notify messaging procedure. For example, S-CSCF 224 may use a {Subscribe, Notify} technique to capture the {Published} state of BGCF 226 and/or PDF 232 via SIP instant messages (IMs). Other techniques for obtaining resource availability information from BGCF 226 and/or PDF 232 may alternatively be used. In other implementations, S-CSCF 224 may receive resource availability information from devices in addition to or other than BGCF 226 and PDF 232.

The resource availability information from BGCF 226 and/or PDF 232 may be stored (block 520). For example, S-CSCF 224 may store the resource availability information in a memory, such as memory 330. In one implementation, S-CSCF 224 may associate information identifying the device, from which resource availability information is received, in the memory with the received information. S-CSCF 224 may continually update the stored resource availability as new resource availability information is received from BGCF 226 and PDF 232.

Figure 6:
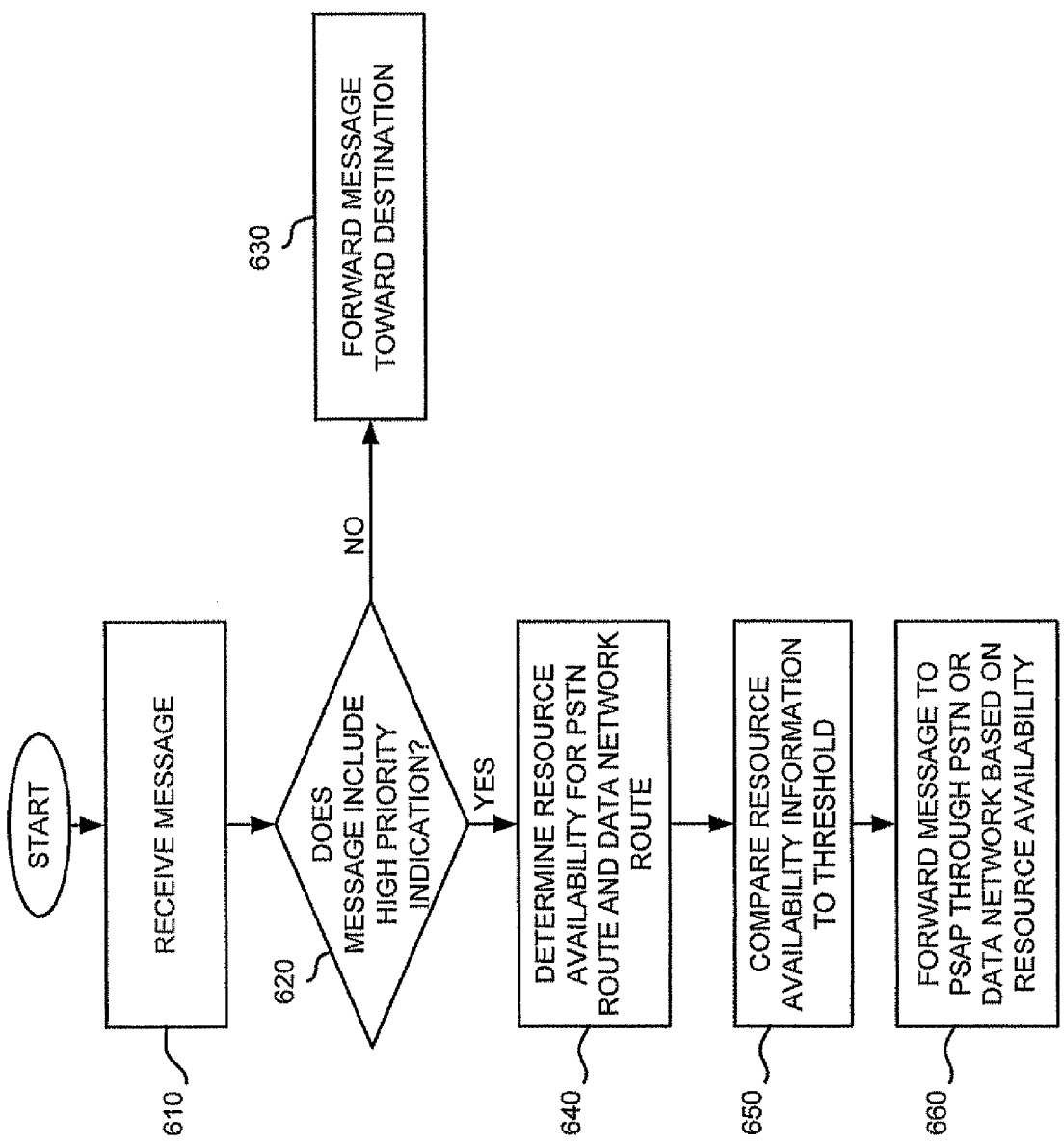
FIG. 6 illustrates a flow chart of exemplary processing for handling priority calls in an exemplary implementation consistent with principles of the invention.

FIG. 6 illustrates a flow chart of exemplary processing for handling priority calls in an exemplary implementation consistent with principles of the invention. The processing of FIG. 6 may be performed by S-CSCF 224. The processing of FIG. 6 may be performed by another device in system 200 in other implementations.

Processing may begin with S-CSCF 224 receiving a message from a user device, such as user device 210 (block 610). In one implementation, the message may include a SIP message, such as an INVITE message or another type of message.

S-CSCF 224 may determine whether the message includes a high priority indication (block 620). User device 210 may transmit a message with a high priority indication when, for example, a user of user device 210 places an emergency communication, such as, for example, a 9-1-1 call, a GETS communication, or another type of high priority (or emergency) communication. S-CSCF 224 may identify that a message includes a high priority indication based on a header of the message. In one implementation, S-CSCF 224 may determine that a message is a high priority message when a Resource-Priority header field (or other header field) is set in the message (e.g., when the Resource-Priority header field includes a "1" bit).

If the received message does not include a high priority indication (block 620—NO), S-CSCF 224 may forward the message toward its destination according to typical routing procedures (block 630). For example, S-CSCF 224 may forward the message toward another IMS subscriber, a PSTN destination, etc. in a known manner.

If, on the other hand, the received message includes a high priority indication (block 620—YES), S-CSCF 224 may determine the resource availability for establishing the emergency communication with a PSAP 290 through a PSTN, such as PSTN 280, and through a data network, such as data network 260 (block 640). For example, S-CSCF 224 may determine the resource availability based on information received from other devices in system 200, such as BGCF 226 and PDF 232. In one implementation, S-CSCF 224 may determine the resource availability information via a lookup operation.

S-CSCF 224 may compare the resource availability information for data network 260 and the resource availability information for PSTN 280 to a resource availability threshold (block 650). Alternatively, S-CSCF 224 may compare the resource utilization in data network 260 and the resource utilization in PSTN 280 to a resource utilization threshold. Each threshold may be configurable.

S-CSCF 224 may forward the received message to a PSAP 290 through PSTN 280 or through data network 260 based on the resource availability of PSTN 280 and data network 260 (block 660). For example, if the resource availability through PSTN 280 does not exceed the resource availability threshold (or, in another implementation, the resource utilization of PSTN 280 exceeds the resource utilization threshold) and the resource availability through data network 260 exceeds the resource availability threshold (or, in another implementation, the resource utilization of data network 260 does not exceed the resource utilization threshold), S-CSCF 224 may select data network 260 instead of PSTN 280 for forwarding the received message to a PSAP 290. If on the other hand, the resource availability through PSTN 280 exceeds the resource availability threshold (or, in another implementation, the resource utilization of PSTN 280 does not exceed the resource utilization threshold) and the resource availability through data network 260 does not exceed the resource availability threshold (or, in another implementation, the resource utilization of data network 260 exceeds the resource utilization threshold), S-CSCF 224 may select PSTN 280 instead of data network 260 for forwarding the received message to a PSAP 290. In this way, for example, the probability of establishing the emergency communication as quickly as possible is provided.

In those situations where the resource availability through PSTN 280 and data network 260 exceed the resource availability threshold (or, in another implementation, the resource utilization in PSTN 280 and data network 260 do not exceed the resource utilization threshold), S-CSCF 224 may randomly select PSTN 280 or data network 260 for forwarding the received message to a PSAP 290. In another implementation, S-CSCF 224 may be configured to select either PSTN 280 or data network 260 when the resource availability through PSTN 280 and data network 260 exceed the resource availability threshold (or, in another implementation, the resource utilization in PSTN 280 and data network 260 do not exceed the resource utilization threshold).

In those situations where the resource availability through PSTN 280 and data network 260 do not exceed the resource availability threshold (or, in another implementation, the resource utilization in PSTN 280 and data network 260 exceed the resource utilization threshold), S-CSCF 224 may use a backup emergency wireline or wireless link for establishing the emergency communication with PSAP 290.

Figure 7:
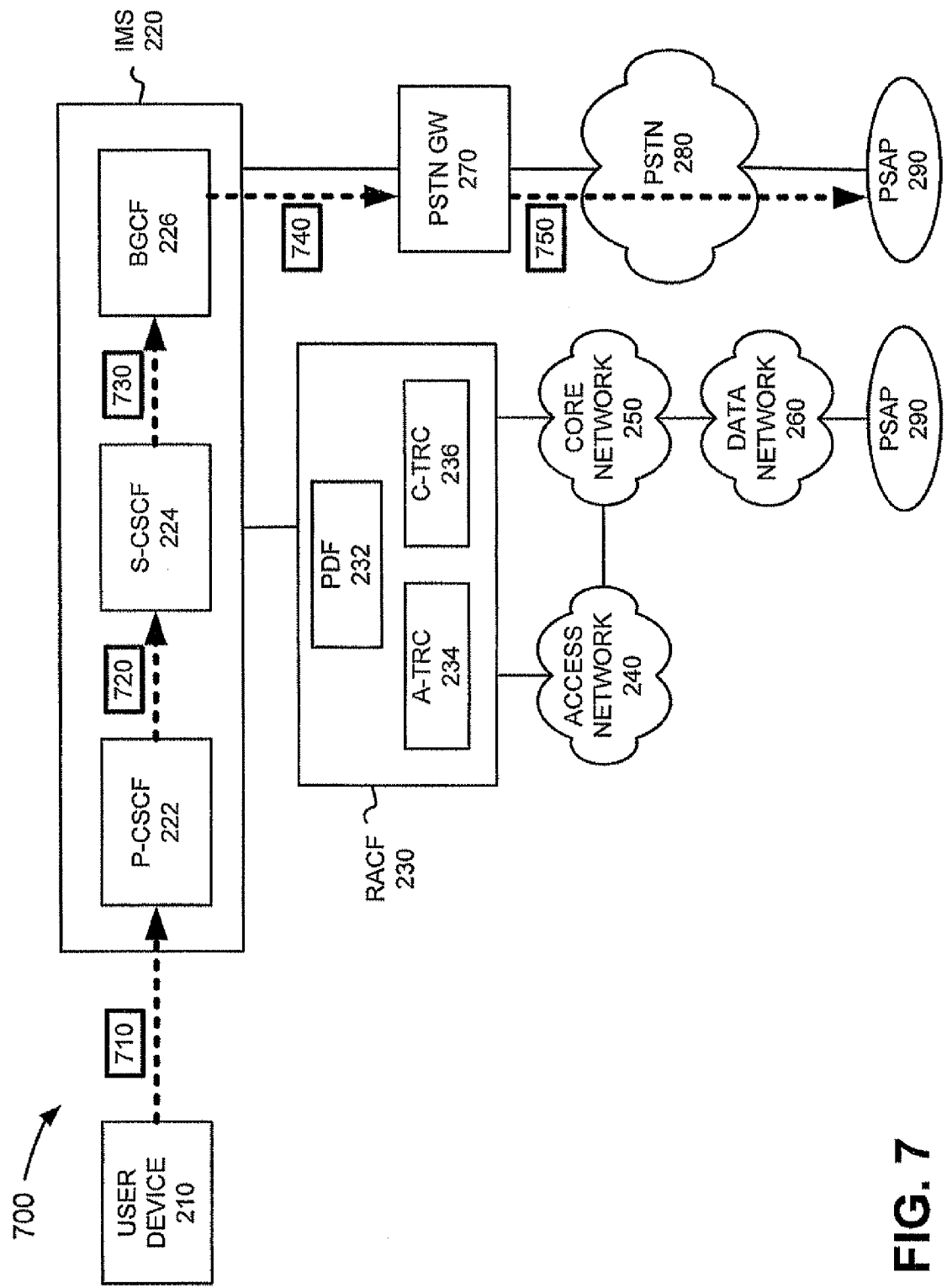
FIGS. 7 and 8 illustrate examples of the processing described with respect to FIG. 6.

The following examples illustrate the processing described above with respect to FIG. 6. In a first example 700, assume that a user of user device 210 places a 9-1-1 call, which causes a high priority message to be transmitted to P-CSCF 222 of IMS 220 (block 710), as illustrated in FIG. 7. P-CSCF 222 may forward the high priority message to S-CSCF 224 (block 720). In response to receiving the high priority message, S-CSCF 224 may identify the message as a high priority message based, for example, on a Resource-Priority header field being set in the message. In response to the message being identified as a high priority message, S-CSCF 224 may identify the resource utilization through PSTN 280 and data network 260. Assume, in this example, that S-CSCF 224 determines that the resource utilization via data network 260 exceeds a resource utilization threshold and that the resource utilization via PSTN 280 does not exceed the resource utilization threshold. In this case, S-CSCF 224 may forward the message to BGCF 226 (block 730). BGCF 226 may forward the message to PSAP 290 via PTSN gateway 270 and PSTN 280 in a known manner (blocks 740 and 750).

Figure 8:
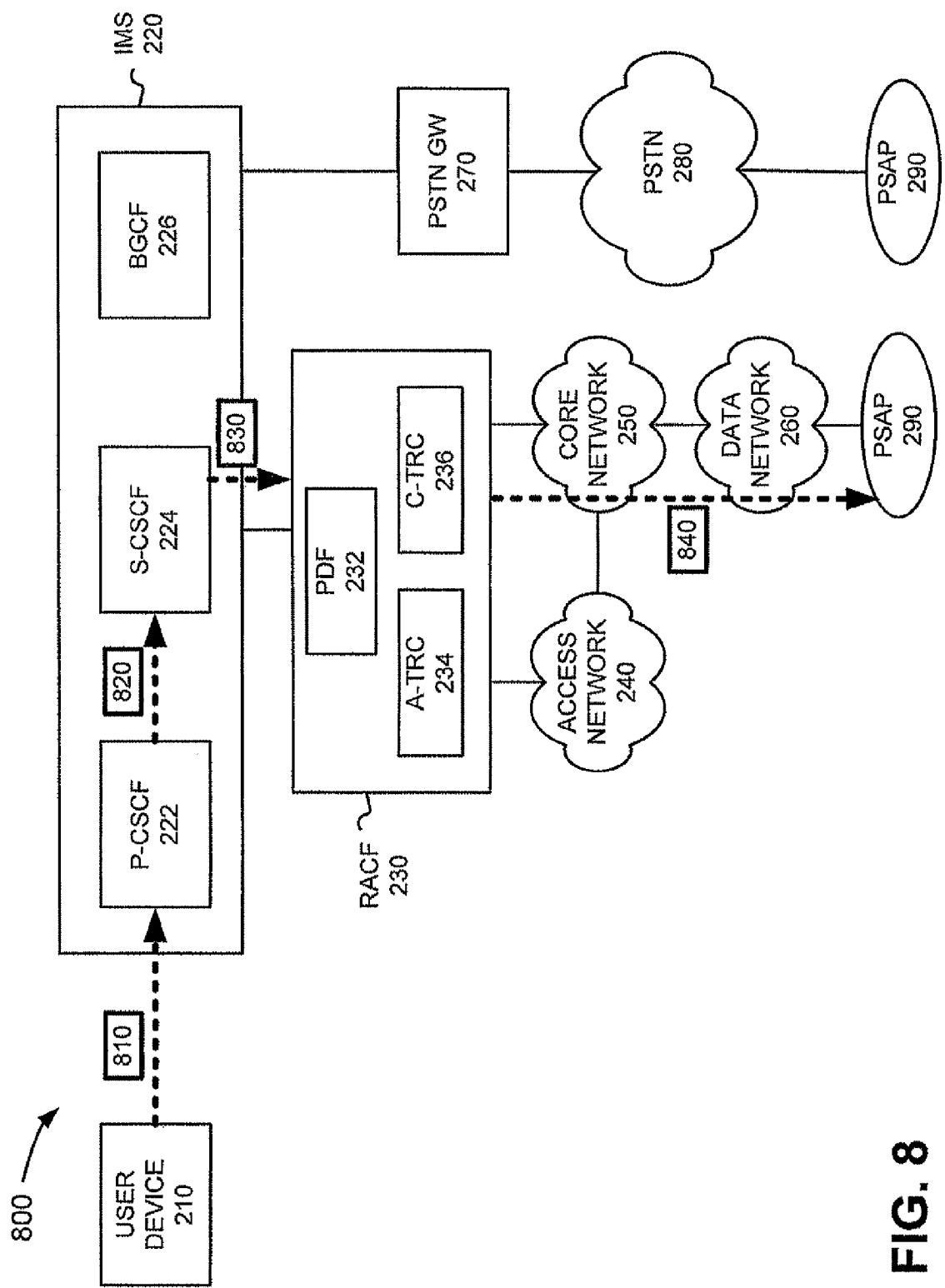

In a second example 800, assume that a user of user device 210 places a 9-1-1 call, which causes a high priority message to be transmitted to P-CSCF 222 of IMS 220 (block 810), as illustrated in FIG. 8. P-CSCF 222 may forward the high priority message to S-CSCF 224 (block 820). In response to receiving the high priority message, S-CSCF 224 may identify the message as a high priority message based, for example, on a Resource-Priority header field being set in the message. In response to the message being identified as a high priority message, S-CSCF 224 may identify the resource utilization through PSTN 280 and data network 260. Assume, in this example, that S-CSCF 224 determines that the resource utilization via PSTN 280 exceeds a resource utilization threshold and that the resource utilization via data network 260 does not exceed the resource utilization threshold. In this case, S-CSCF 224 may forward the message to RACF 230 (block 830). RACF 230 may forward the message to PSAP 290 via core network 250 and data network 260 in a known manner (block 840).

CONCLUSION

Implementations described herein provide priority call routing in an Internet Protocol (IP) Multimedia Subsystem (IMS). Priority calls are routed through a data network or PSTN based on resource utilization in the data network and PSTN.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of acts have been described above with respect to FIGS. 5 and 6, the order of the acts may differ in other implementations consistent with principles of the invention. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments consistent with the principles of the invention is not limiting of the invention. Thus, the operation and behavior of the preferred embodiments of the invention were described without reference to the specific software code it being understood that software and control hardware may be designed to implement the embodiments based on the description herein Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, at an Internet Protocol Multimedia Subsystem (IMS), a message to request a communication through a packet switched network, where the packet switched network includes a core network associated with the IMS and an access network that provides access to the core network;
    determining, by the IMS, whether a sender designated the message as a priority message;
    when the sender designates the message as the priority message:
        identifying, by the IMS and in response to determining that the sender designated the message as the priority message, a first resource availability through the packet switched network and a second resource availability through a circuit switched network, where identifying the first resource availability includes:
            determining, via a resource access control function (RACF) associated with the IMS, resource availability and topology information for the access network,
            determining, via the RACF, resource availability and topology information for the core network, and
            determining the first resource availability based on the resource availability and topology information for the access network and the resource availability and topology information for the core network, and
        establishing, by the IMS, the communication through one of the packet switched network or the circuit switched network based on the first resource availability through the packet switched network and the second resource availability through the circuit switched network; and
    when the sender does not designate the message as the priority message, establishing the communication through the packet switched network without identifying the first resource availability through the packet switched network and the second resource availability through the circuit switched network.

2. The method of claim 1, where determining whether the sender has designated the message as the priority message comprises:
    identifying the message as the priority message based on a header of the message.

3. The method of claim 1,
    where the message includes a Session Initiation Protocol (SIP) message, and
    where determining whether the sender has designated the message as the priority message comprises:
        identifying the message as the priority message based on a Resource-Priority header field of the SIP message.

4. The method of claim 1, where identifying the first resource availability and the second resource availability includes:
identifying the first resource availability based on first resource availability information received from a first device associated with the packet switched network, and
identifying the second resource availability based on second resource availability information received from a second device that is associated with the circuit switched network, where the first device and the second device differ.

5. The method of claim 1, where establishing the communication through the one of the packet switched network or the circuit switched network further includes:
establishing the communication to a Public Safety Answering Point via the one of the packet switched network or the circuit switched network.

6. The method of claim 1, where identifying the first resource availability and the second resource availability and routing the message through one of the packet switched network or the circuit switched network are performed by a Serving Call Session Control Function within the IMS.

7. The method of claim 1, where establishing the communication through one of the packet switched network or the circuit switched network includes:
comparing, prior to establishing the communication, the first resource availability through the packet switched network to a first threshold,
comparing, prior to establishing the communication, the second resource availability through the circuit switched network to a second threshold,
storing a policy rule that includes a selection criteria between the packet switched network and the circuit switched network, and
transmitting the message through one of the packet switched network or the circuit switched network based on applying the policy rule to results of comparing the first resource availability through the packet switched network to the first threshold and comparing the second resource availability through the circuit switched network to the second threshold.

8. The method of claim 7, where transmitting the message includes:
randomly transmitting, based on the policy rule, the message to one of the packet switched network or the circuit switched network when the first resource availability, through the packet switched network, exceeds the first threshold and the second resource availability, through the circuit switched network, exceeds the second threshold.

9. The method of claim 7, where transmitting the message includes:
transmitting, based on the policy rule, the message to a predetermined one of the packet switched network or the circuit switched network when the first resource availability, through the packet switched network, exceeds the first threshold and the second resource availability, through the circuit switched network, exceeds the second threshold.

10. A system comprising:
an Internet Protocol Multimedia Subsystem (IMS) device to:
store a policy rule,
receive a non-priority message,
route the non-priority message through one of a packet switched network or a circuit switched network based on a destination for the non-priority message, where the IMS device routes the non-priority message without determining a first resource availability level through the packet switched network and a second resource availability level through the circuit switched network, where the packet switched network includes a core network, associated with the IMS, and an access network that provides access to the core network
receive a priority message,
determine, in response to receiving the priority message, the first resource availability level through the packet switched network and the second resource availability level through the circuit switched network, where the IMS device, when determining the first resource availability, is further to:
determine, via a resource access control function (RACF) associated with the IMS, resource availability and topology information for the access network,
determine, via the RACF, resource availability and topology information for the core network, and
determining the first resource availability based on the resource availability and topology information for the access network and the resource availability and topology information for the core network, and
route the priority message through one of the packet switched network or the circuit switched network based on applying the policy rule to the first resource availability level and the second resource availability level.

11. The system of claim 10, where the IMS device is further to distinguish the non-priority message and the priority message based on information in respective headers of the non-priority message and the priority message.

12. The system of claim 10, where the priority message includes a Session Initiation Protocol (SIP) message, and
where the IMS device identifies the priority message based on a Resource-Priority header field of the SIP message.

13. The system of claim 10,
where, when the IMS device determines the first resource availability level, the IMS device receives resource availability information from a first device associated with the packet switched network,
where, when the IMS device determines the second resource availability level, the IMS device receives resource availability information from a second device associated with the circuit switched network.

14. The system of claim 13, where
the second device includes a Breakout Gateway Control Function, and
the first device includes a Policy Decision Function associated with the RACF.

15. The system of claim 10, where the IMS device, when routing the priority message, forwards the priority message to a Public Safety Answering Point via the one of the packet switched network or the circuit switched network.

16. The system of claim 10, where the IMS, when forwarding the priority message, is further to:
compare, prior to routing the priority message, the first resource availability level through the packet switched network to a first threshold,
compare, prior to routing the priority message, the second resource availability level through the circuit switched network to a second threshold, and
forward the priority message based on a result of comparing the first resource availability level through the packet switched network to the first threshold and a result of comparing the second resource availability level through the circuit switched network to the second threshold.

17. The system of claim 16, where, when the IMS device forwards the priority message, the IMS device randomly forwards, based on the policy rule, the priority message to one of the packet switched network or the circuit switched network when the first resource availability level exceeds the first threshold and the second resource availability level exceeds the second threshold.

18. A method comprising:
receiving, in an Internet Protocol Multimedia Subsystem (IMS) associated with the packet switched network, a Session Initiation Protocol (SIP) call request, where the packet switched network includes a core network associated with the IMS and an access network that provides access to the core network;
identifying, via the IMS, the SIP call request as one of an emergency call request or an non-emergency call request;
routing, via the IMS and when the SIP call request is identified as the emergency call request, the SIP call request toward a destination via one of a circuit switched network, a packet switched network, or a backup emergency link, where the circuit switched network, the packet switched network, and the backup emergency link differ, and where routing the SIP call request includes:
obtaining a first resource utilization associated with the CIRCUIT SWITCHED NETWORK,
comparing the first resource utilization to a first threshold to obtain a first comparison result,
obtaining a second resource utilization associated with the packet switched network, where obtaining the second resource utilization includes:
determining, via a resource access control function (RACF) associated with the IMS, resource availability and topology information for the access network,
determining, via the RACF, resource availability and topology information for the core network, and
determining the second resource utilization based on the resource availability and topology information for the access network and the resource availability and topology information for the core network,
comparing the second resource utilization, in the packet switched network, to a second threshold to obtain a second comparison result, and
forwarding the SIP call request toward the destination via one of the circuit switched network, the packet switched network, or the backup emergency link based on the first comparison result and the second comparison result; and
routing, via the IMS and when the SIP call request is identified as the non-emergency call request, the SIP call request toward the destination without comparing the first resource utilization to the first threshold and without comparing the second resource utilization to the second threshold.

19. The method of claim 18, where the first threshold and the second threshold are configurable by a user.

20. The method of claim 18, where identifying the SIP call request as one of the emergency call request or the non-emergency call request includes:
identifying the SIP call request as the one of the emergency call request or the non-emergency call request based on information stored in a Resource-Priority header field of the SIP call request.

21. The method of claim 18, where forwarding the SIP call request includes:
forwarding, via the backup emergency link, the SIP call request to the destination when the first comparison result indicates that the first resource utilization exceeds the first threshold, and the second comparison result indicates that the second resource utilization exceeds the second threshold.

22. The method of claim 18, where forwarding the SIP call request via the backup emergency link includes:
establishing, by a Serving Call Session Control Function (S-CSCF) associated with the IMS and via the backup emergency link, a communication session on the backup emergency link, based on the SIP call request.

\* \* \* \* \*